United States Patent [19]

Link et al.

[11] Patent Number: 5,690,203
[45] Date of Patent: Nov. 25, 1997

[54] MOTOR VEHICLE FRICTION CLUTCH WITH AUTOMATIC WEAR ADJUSTMENT

[75] Inventors: Achim Link, Schweinfurt; Reinhold Weidinger, Unterspiesheim, both of Germany

[73] Assignee: Fichtel & Sachs AG, Schweinfurt, Germany

[21] Appl. No.: 606,416

[22] Filed: Feb. 23, 1996

Related U.S. Application Data

[63] Continuation-in-part of Ser. No. 330,692, Oct. 28, 1994, Pat. No. 5,560,463.

[30] Foreign Application Priority Data

Nov. 4, 1993 [DE] Germany .................. 43 37 613.4
Feb. 25, 1995 [DE] Germany .................. 195 06 698.7

[51] Int. Cl.⁶ .................................................. F16D 13/75
[52] U.S. Cl. .................................... 192/70.25; 192/111 A
[58] Field of Search ............................ 192/70.25, 111 A

[56] References Cited

U.S. PATENT DOCUMENTS

| | | | |
|---|---|---|---|
| 5,320,205 | 6/1994 | Kummer et al. | 192/70.25 |
| 5,349,882 | 9/1994 | Kamio | 192/111 A X |
| 5,377,803 | 1/1995 | Link et al. | 192/111 A |
| 5,419,418 | 5/1995 | Uenohara et al. | 192/70.25 |
| 5,431,268 | 7/1995 | Mizukami et al. | 192/70.25 |
| 5,513,736 | 5/1996 | Mizukami | 192/111 A |
| 5,540,313 | 7/1996 | Weidinger | 192/111 A X |
| 5,560,463 | 10/1996 | Link et al. | 192/111 A X |

FOREIGN PATENT DOCUMENTS

| | | |
|---|---|---|
| 0622559 | 11/1994 | European Pat. Off. . |
| 2916755 | 11/1979 | Germany . |
| 2920932 | 11/1979 | Germany . |
| 4306505 | 9/1993 | Germany . |
| 0568990 | 11/1993 | Germany . |
| 4306688 | 11/1993 | Germany . |
| 4322506 | 1/1994 | Germany . |
| 4412107 | 11/1994 | Germany . |
| 2022729 | 12/1979 | United Kingdom . |
| 3518781 | 12/1986 | United Kingdom . |
| 2264989 | 9/1993 | United Kingdom . |
| 2284025 | 5/1995 | United Kingdom . |

Primary Examiner—Charles A. Marmor
Assistant Examiner—Saul J. Rodriguez
Attorney, Agent, or Firm—Nils H. Ljungman and Associates

[57] ABSTRACT

A motor vehicle friction clutch which makes an automatic wear adjustment, whereby there is at least one clearance sensor which acts by means of an actuator lever which points radially inward on an adjustment device, is located opposite the application plate, and consists of a ring element which is realized in the form of a sheet metal ring which encircles the axis of rotation concentrically. As a result of the combination of these two elements, it is possible to make do with only one clearance sensor, which means that the overall system can be manufactured economically.

20 Claims, 10 Drawing Sheets

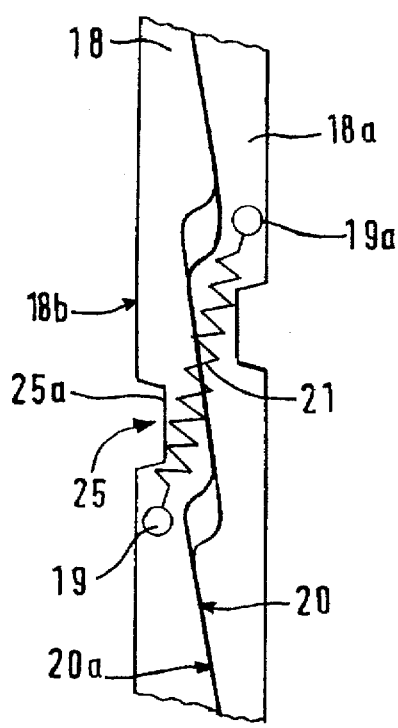
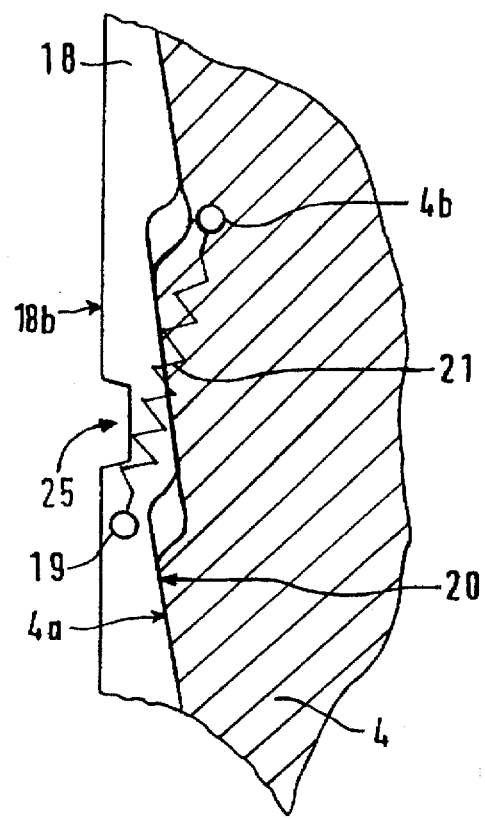
FIG. 2a  FIG. 2b
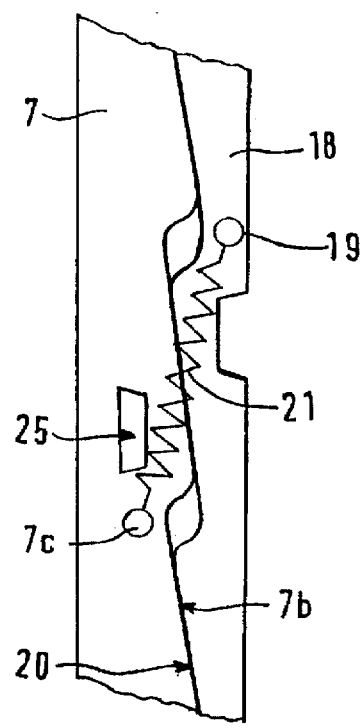
FIG. 2c

MOTOR VEHICLE FRICTION CLUTCH WITH AUTOMATIC WEAR ADJUSTMENT

CROSS-REFERENCE TO RELATED APPLICATION

The present application is a continuation-in-part of U.S. patent application Ser. No. 08/330,692, filed on Oct. 28, 1994 by Achim Link, Reinhold Weidinger, Heiko Schulz-Andres, Klaus Elsnet, Rainer Weidmann, Ralf Nenninger, and Michael Weiss, entitled "Friction Clutch for a Motor Vehicle Transmission and a Friction Clutch Having Automatic Adjustment for Wear", which issued as U.S. Pat. No. 5,560,463 on Oct. 1, 1996.

BACKGROUND OF THE INVENTION

1. Field of the Invention

The present invention generally relates to a motor vehicle friction clutch with automatic wear adjustment. The friction clutch can include a pressure plate, which pressure plate is fastened to a flywheel with the interposition of a clutch disc with friction linings. The pressure plate or application plate is fastened in a clutch housing non-rotationally, but axially movably. The friction clutch also includes a membrane spring installed with bias between the application plate and the clutch housing, which membrane spring, in the vicinity of its outside periphery and in an area with a smaller diameter, is supported both on the clutch housing and also on a contact area on the application plate, whereby the contact occurs with the interposition of an adjustment device which makes possible an axial displacement of the application plate away from the membrane spring as a function of the wear of the friction linings of the clutch disc.

2. Background Information

German Patent Application 43 06 688 describes a motor vehicle friction clutch which has a device which makes an automatic adjustment to compensate for wear of the friction linings. This publication discloses radially-moving, conical components which, after wear occurs, correspondingly increase the distance between the membrane spring and the application plate by means of a radially outward movement. Such a wear adjustment functions correctly when there are several clearance sensors which are distributed around the periphery. Unexamined German Patent Application 44 12 107 also describes a device which makes an automatic wear adjustment, which device includes two ring elements which are located concentric to the axis of rotation. Pressure is applied to the two ring elements by a spring force which moves the two ring elements toward one another in the peripheral direction. The two ring elements are in contact with one another by means of partial surfaces which form a slope, and, when wear occurs, the two ring elements increase the distance between the membrane spring and the application plate correspondingly.

OBJECT OF THE INVENTION

An object of the present invention is to provide a motor vehicle friction clutch which makes an automatic adjustment to compensate for wear, and which can be manufactured as simply and as economically as possible, while continuing to perform its correct function.

SUMMARY OF THE INVENTION

The invention teaches that this object can be accomplished by locating at least one clearance sensor on the pressure plate, which clearance sensor acts by means of a radially-inward pointing actuator levers directly or indirectly on a component of the adjustment device. The clearance sensor is mounted so that it can be displaced axially and can be fixed in position, preferably by friction, in an opening in the application plate, which opening can be oriented parallel to the axis of rotation. The clearance sensor can have an axial stop, which stop is non-detachably connected to the housing, and which stop limits the movement of the clearance sensor toward the flywheel, and, during the release procedure following the occurrence of the wear, the adjustment device can penetrate into the increased distance between the clearance sensor and the application plate.

The adjustment device can include at least one ring element, which ring element can be concentric with respect to the axis of rotation, and can be in encircling contact with a guide diameter of the application plate. The ring element can be realized so that it is strong or rigid in the axial direction, and can have partial surfaces which effect an axial slope on one peripheral end surface of the ring element. Pressure is applied to the ring element by a spring device in the peripheral direction, in the sense of a twisting movement, thereby effecting an axial enlargement of the installation space.

It has been determined that it can be possible to reduce the number of clearance sensors without any adverse effects on function. In most cases, the use of one clearance sensor may be sufficient, but in critical clutches it may be necessary to use two clearance sensors located approximately diagonally opposite one another. This simplification is possible because the ring element is correctly guided on a guide diameter of the application plate, which guide diameter is oriented concentric to the axis of rotation, and because the ring element can be realized so that it is rigid in the axial direction. The ring element can thereby be guided on an inside diameter of the application plate, and can be realized so that the ring element is open on its periphery. However, it is also possible to provide the guide on an outside diameter of the application plate, in which case a ring element which is closed on the periphery is preferable.

In accordance with one preferred embodiment of the present invention, the matching partial surfaces which increase the axial distance can be located in the application plate or can be machined into the membrane spring, or, alternatively, there can be a second ring element which is in axial alignment with the first ring element. It is thereby possible, on the one hand, to make do with only one ring element, whereupon the number and variety of the required parts is reduced, but it is also possible to provide two ring elements, which simplifies the assembly to the extent that the spring element provided for the relative rotation of the two ring elements can be pre-assembled with the ring elements.

The present invention also teaches that it can be advantageous to provide the ring element with a rectangular cross section, whereby the longer edge of the ring element is guided parallel to the axis of rotation on a guide diameter of the application plate, so that the ring element can be easily manufactured from a strip of metal, e.g. by stamping.

The present invention also teaches that pressure can be applied to each clearance sensor by a spring in the sense of fixing the clearance sensor in position in the opening in the application plate. This spring can essentially ensure a tipping of the clearance sensor in the opening in the application plate to create a self-locking connection under essentially all operating conditions except for the wear adjustment. This spring can thereby be supported on the actuator lever and on the application plate. With the appropriate selection of the support points, this spring can generate a sufficient clamping effect in spite of the low spring force.

The present invention also teaches that each clearance sensor (if more than one clearance sensor is necessary) can be provided with a spring in the vicinity of the opening in the application plate for axial displacement, which spring presses the clearance sensor against the application plate toward the flywheel. This spring is essentially used to achieve the basic setting during the assembly of the friction clutch, in that each clearance sensor can be brought into contact with a component which is non-detachably connected to the housing, e.g. the clearance sensor is brought into contact with the flywheel.

The clearance sensor can thereby be advantageously guided by means of a sliding pin which extends parallel to the axis of rotation in a boring, and the spring can be located concentrically around the sliding pin, and is in contact on one hand with the application plate, and on the other hand with the sliding pin (e.g. on the head). Thus the spring can be securely guided and installed in a space-saving manner.

An additional advantageous feature of the present invention is that, in accordance with a preferred embodiment, each clearance sensor has a fixing device which protects the clearance sensor against twisting in the opening, which opening is preferably realized in the form of a boring. The fixing device can preferably be realized in the form of a pin, which pin extends parallel to the boring and at some radial distance from it. It can thereby be ensured that the clearance sensor, which clearance sensor is subjected to centrifugal force, will retain its position required for correct operation with respect to the application plate.

The present invention also teaches that the spring to fix the clearance sensor in position can be located concentrically around the pin which secures the clearance sensor against twisting, whereby the spring pushes the actuator lever away from the application plate. The pin can thereby provide both protection against twisting and guidance for this spring.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the invention resides broadly in a friction clutch for a motor vehicle, the friction clutch comprising: a clutch housing; a clutch disc disposed within the housing, the clutch disc defining an axis of rotation and an axial direction parallel to the axis of rotation; the clutch disc for being disposed on a transmission input shaft; a pressure plate for engaging and disengaging the clutch disc with a flywheel of an internal combustion engine; the clutch disc being disposed between the pressure plate and the flywheel, the clutch disc comprising friction lining apparatus for contacting the flywheel and the pressure plate upon engagement of the friction clutch; apparatus for biasing the pressure plate towards the flywheel, the biasing apparatus being disposed between the clutch housing and the pressure plate; apparatus for adjusting the axial distance between the pressure plate and the apparatus for biasing upon wear of the friction lining apparatus; at least one apparatus for sensing wear of the friction lining apparatus, the at least one sensing apparatus comprising: projection apparatus, the projection apparatus comprising: a first portion extending towards the adjusting apparatus; the first portion being operatively connected to the adjusting apparatus to permit the adjusting apparatus to adjust the axial distance between the pressure plate and the apparatus for biasing during a disengagement process of the friction clutch, which disengagement process follows an engagement process of the friction clutch wherein wear of the friction lining apparatus has occurred; a second portion disposed in the pressure plate; and apparatus for providing friction for frictionally positioning the second portion with respect to the pressure plate, the apparatus for providing friction comprising apparatus for permitting sliding axial movement, against the friction, of at least one of: the pressure plate, and the at least one sensing apparatus, one with respect to the other.

BRIEF DESCRIPTION OF THE DRAWINGS

The present invention is explained in greater detail below with reference to the accompanying drawings, in which:

FIG. 2a shows a partial plan view of two ring elements;

FIG. 2b shows a partial plan view of the ring element and the pressure plate having matching surfaces;

FIG. 2c shows a partial plan view of the ring element and the membrane spring having matching surfaces;

FIG. 4 shows a partial section through a variant of the friction clutch illustrated in FIGS. 3 and 3a;

DESCRIPTION OF THE PREFERRED EMBODIMENT

Figures 1, 2:
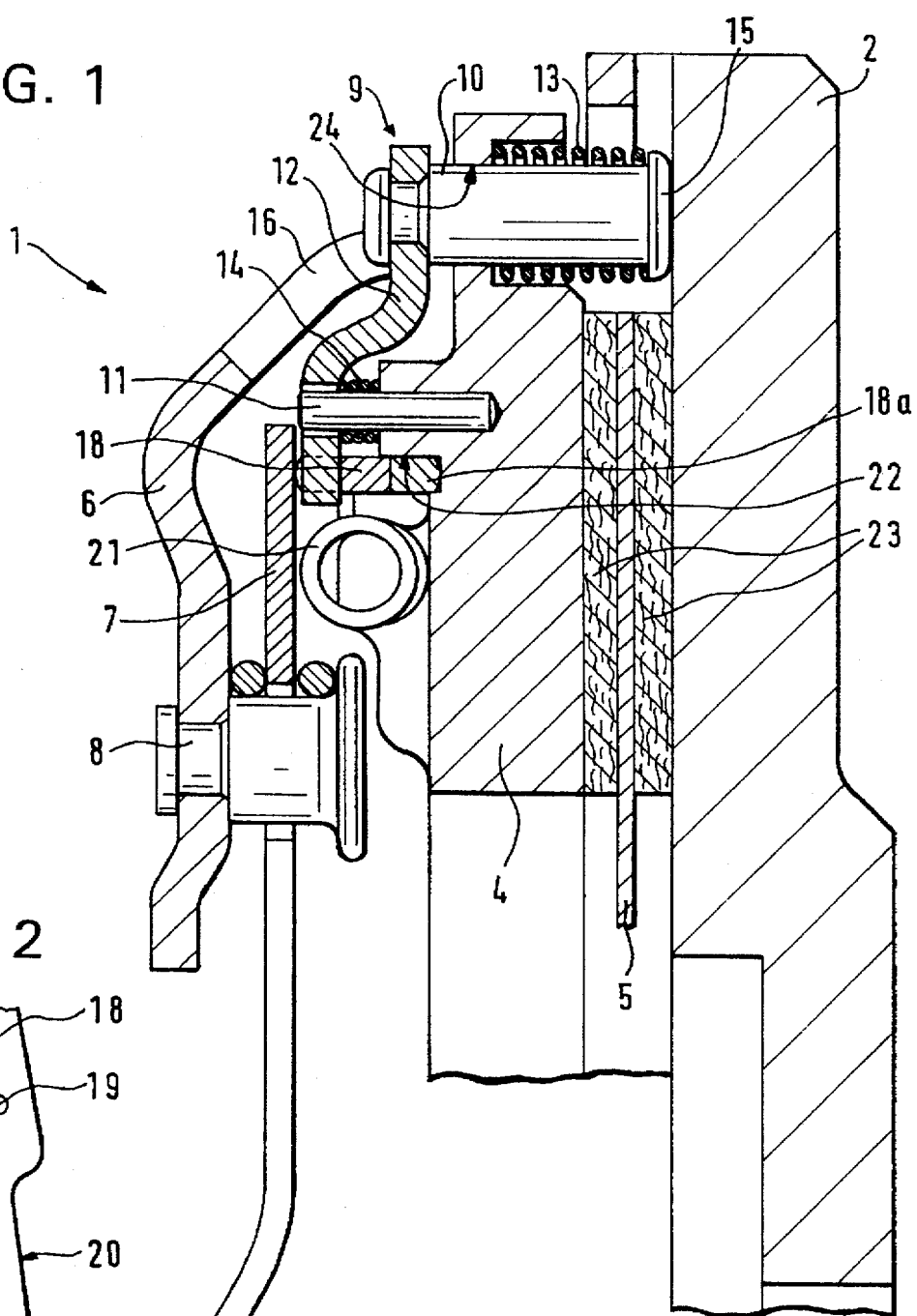
FIG. 1 shows the upper half a longitudinal section through a friction clutch.
FIG. 2 shows a partial plan view of the ring element of FIG. 1.
Figure 1A:
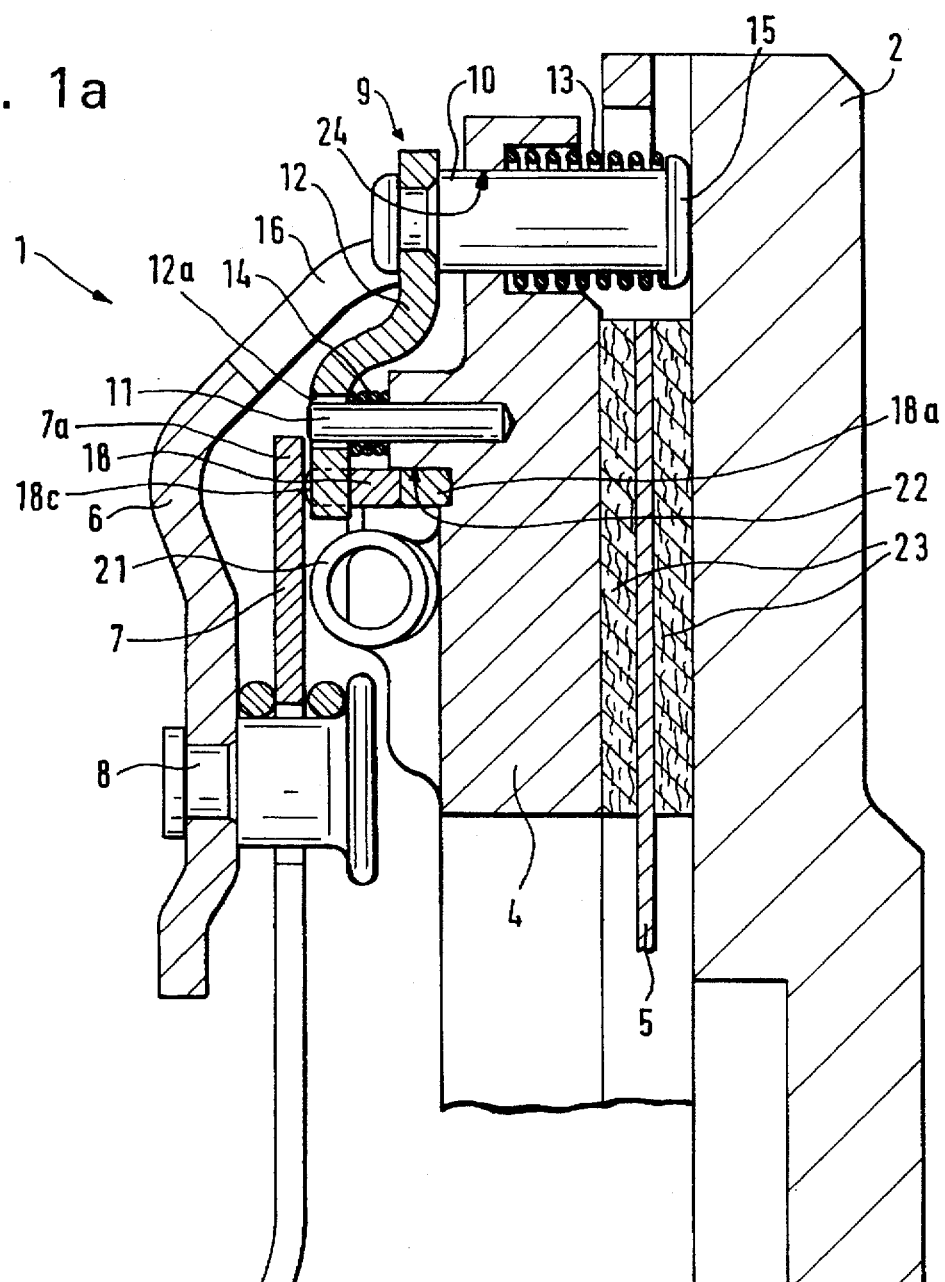
FIG. 1a shows substantially the same view as FIG. 1, but is more detailed.

The friction clutch 1 shown in FIGS. 1 and 1a can fastened to a flywheel 2 of an internal combustion engine, which flywheel 2 is able to rotate around the axis of rotation 3. The friction clutch 1 can preferably include a clutch housing 6, which clutch housing 6 is conventionally bolted to the flywheel 2. Between the flywheel 2 and the clutch housing 6 there can be an application plate 4, which application plate 4 is non-rotationally connected to the clutch housing 6, but guided so that it can move axially. Tangential leaf springs (not shown) are conventionally used for the connection between the application plate 4 and the clutch housing 6, which springs are well known and will not be discussed further here.

Between the application plate 4 and the flywheel 2, there can preferably be a clutch disc 5 with friction linings 23. Between the application plate 4 and the clutch housing 6 there is a membrane spring 7, which membrane spring 7 can be mounted so that it can pivot in the area of an intermediate diameter by means of a plurality of spacer bolts 8, which spacer bolts 8 can be fastened to the clutch housing 6. The membrane spring 7 acts in the vicinity of an outside diameter 7a (see FIG. 1a) on the application plate 4 in the sense of a clamping of the friction linings 23 between the application plate 4 and the flywheel 2. Toward the radial inside, the membrane spring 7 can be provided with flexible tabs 17, which flexible tabs 17 can be actuated by means of a release system (not shown here but see FIG. 9). Between the membrane spring 7 and the application plate 4 there is a device for automatic wear adjustment. This device can preferably include at least one ring element 18, which ring element 18 can be oriented concentric to the axis of rotation 3 and can be guided in a guide diameter 22 of the application plate 4. The ring element 18 is shown in a partial plan view in FIG. 2, and preferably has a flat, encircling edge 18b (see FIG. 2a), and, on the opposite side, a plurality of peripheral inclined partial surfaces 20 for which surfaces 20 there are corresponding matching surfaces. Pressure is applied to the ring element 18 in the peripheral direction by a spring 21, e.g. one which is suspended with one end in an opening or openings 19 located in ring element 18.

For example, the ring element 18, as shown in longitudinal section in FIGS. 1 and 1a, can preferably interact with a second ring element 18a, whereby the two ring elements 18 and 18a can be aligned with one another in the axial direction. The ring element 18a can thereby have matching surfaces which correspond to the partial surfaces 20 which are in contact with them. One embodiment of the present invention is shown in FIG. 2a, which illustration shows both ring elements 18, 18a adjacent one another and connected to one another by spring 21 (shown schematically only). As shown in the embodiment of FIG. 2a, ring element 18a can have an opening or openings 19a, in which opening 19a the other end of the spring 21 can be engaged. In addition, ring element 18a can also have surfaces 20a, which surfaces 20a essentially match the surfaces 20 of the ring element 18.

The ring element 18a can, in this case, be supported on the application plate 4, and pressure can be applied to the ring element 18 by the membrane spring 7. In the presence of these two ring elements 18, 18a, the spring 21 acts between the two ring elements 18, 18a, and applies pressure to them so that, as a result of the assent of the partial areas 20 and of the matching partial areas 20a over one another, they can create an axial enlargement of the space which was initially occupied by the ring elements 18, 18a. However, it is also possible, essentially without any additional measures, that only one ring element 18 can be used, the partial surfaces 20 of which can interact, for example, with matching partial surfaces introduced directly into the application plate 4, or these partial surfaces 20 can be realized towards the membrane spring 7, and the membrane spring can then have the corresponding matching surfaces.

An additional embodiment of the present invention is shown in FIG. 2b, which illustration shows a single ring element 18 having the surfaces 20, which surfaces 20 interact with matching surfaces 4a of the application plate 4. In accordance with one embodiment, the surfaces 4a can be provided directly in the surface of the application plate 4, possibly by machining, as shown in FIG. 2b, or the surfaces 4a could possibly be in the form of a ring similar to ring 18, which ring could be firmly attached to the application plate 4 by adhesive or other types of fastenings. In addition, in accordance with the embodiment shown in FIG. 2b, the application plate 4 can have an opening or openings 4b for one end of spring 21, which spring 21 would cause movement of the ring 18 with respect to the application plate 4 when an adjustment is needed.

In accordance with yet another embodiment of the present invention as shown in FIG. 2c, there can preferably be a single ring 18, which ring 18 can be located in the guide diameter 22 of the application plate 4, and which ring 18 has the surfaces 20 which face away from the application plate 4. In accordance with this embodiment, the membrane spring 7 can preferably have matching surfaces 7b, which surfaces 7b correspond to the surfaces 20 of the ring element 18. The surfaces 7b can preferably be machined into outer diameter 7a of the membrane spring 7, or, alternatively, the surfaces 7b could also possibly be in the form of a ring similar to ring 18, which ring could then be firmly attached to the outer diameter 7a of the membrane spring by adhesive or other fastening means. Further, the membrane spring 7 can also have an opening or openings 7c for one end of spring 21, which spring 21 would cause movement of ring 18 with respect to the membrane spring 7 when an adjustment is necessary. In accordance with this particular embodiment, the membrane spring 7 can preferably have a recess 25 in which recess 25 an actuator lever 12 (discussed further below) can be disposed.

The friction clutch 1 can be provided with at least one clearance sensor 9, which clearance sensor 9 has a sliding pin 10 which extends through an opening in the application plate 4 parallel to the axis of rotation 3. The sliding pin 10 is preferably round and the opening in the application plate 4 can accordingly be designed as a boring 24. The sliding pin 10 has a head 15 on its end closer to the flywheel 2. Between this head 15 and the application plate 4 there can be a spring 13, which spring 13 can apply pressure to the clearance sensor 9 toward the flywheel 2. The sliding pin 10, on the side farther from the flywheel 2, can be provided with an actuator lever 12. The actuator lever 12 can extend radially inward through a hole 16 in the clutch housing 6. The actuator lever 12, when no wear has occurred, can fix the position of the clearance sensor 9 in the boring 24 of the application plate 4 by a corresponding tipping. This tipping can be assisted by a second spring 14, which second spring 14 is located around a pin 11 oriented parallel to the axis of rotation 3 in the application plate 4. The pin 11 can preferably protect the actuator lever 12 against twisting, by penetrating a corresponding opening 12a (see FIG. 1a) in the actuator lever 12. The radially inner end of the actuator lever 12, viewed in the axial direction, extends between the outside diameter region 7a of the membrane spring 7 and the application plate 4 to the ring element 18. For this purpose, as shown in the separate illustration of FIG. 2, the ring element 18 can preferably be provided with a corresponding recess 25. When the friction clutch 1 is released, the clamping between the clearance sensor 9 and the boring 24 in the application plate 4 can be assisted by the spring 21 and the partial surfaces 20.

The friction clutch 1 can preferably function as follows:

During assembly, when the friction clutch 1 is engaged and with the interposition of the clutch disc 5, care is taken that the head 15 of the clearance sensor 9 comes into contact against the flywheel 2. The ring element 18 can thereby be set against the force of the spring 21 so that during this assembly process, the ring element 18 is preferably at a small axial distance from the radially inner end of the actuator lever 12. After assembly, the ring element 18 is released, and, as a result of the force of the spring 21, the ring element 18 can be rotated by a certain amount, namely until the axial space between the application plate 4 and the actuator lever 12 is filled by the ring element 18. The membrane spring 7 can thereby be in contact with the edge 18c (see FIG. 1a) of the ring element 18 farther from the application plate 4, and the membrane spring 7 can be located at some distance from the actuator lever 12. The slope of the partial surfaces 20 can thereby be designed so that the force of the membrane spring 7 cannot cause any relative movement of the ring element 18 in the peripheral direction. If, when the vehicle is started under a high load, wear occurs on the friction linings 23, the application plate 4, as a result of the force of the membrane spring 7 together with the ring element 18, moves by the magnitude of the wear toward the flywheel 2. In other words, and in accordance with one embodiment, after wear has occurred on the friction linings 23, and the friction linings 23 have thus become thinner, the membrane spring 7 will move the application plate 4 closer to the flywheel 2 by the amount of the wear.

As a result of the contact between the head 15 of the sliding pin 10 against the flywheel 2, the clearance sensor 9 is essentially unable to follow this relative movement of the application plate 4 toward the flywheel 2. In this operating status, the force of the membrane spring 7 can preferably neutralize the frictional engagement between the sliding pin 10 and the boring 24. In other words, and in accordance with one embodiment of the present invention, the force of the membrane spring 7 can overcome the frictional engagement between the sliding pin 10 and the boring 24, such that the application plate 4 can move towards the flywheel 2 with respect to the pin 10 (i.e. the pin 10 remains stationary while the pressure plate 4 moves closer to the flywheel 2).

In accordance with one embodiment of the present invention, the frictional engagement between the pin 10 and the boring 24 can be provided by the "tilting" of pin 10 in the bore 24, which "tilting" can be accomplished by the springs 14 and 13. Thus, the membrane spring 7, once wear has occurred, can overpower spring 14 and also spring 13, and cause the application plate 4 to move closer to the flywheel 2 while the clearance sensor 9 remains stationary.

Thus, between the radially inner end of the actuator lever 12 and the ring element 18, in the vicinity of the recess 25, there can be a distance which corresponds to the wear on the friction linings 23. During the subsequent release process, when the flexible tabs 17 are moved by the release system toward the flywheel 2, and the membrane spring 7 executes a movement in the opposite direction in the vicinity of its outside diameter 7a, it is possible, due to the force of the spring 21, to rotate the ring element 18 around the axis of rotation 3, whereby due to the inclined partial surfaces 20, the distance with respect to the actuator 12 can be compensated for, and the actuator lever 12 is once again in contact with the application plate 4 without any axial clearance. During the next engagement process, the axial distance between the radially outer area 7a of the membrane spring 7 and the application plate 4 can be increased by the magnitude of the wear which has occurred previously, so that when the friction clutch 1 is engaged, the membrane spring 7 has essentially retained its original installed position. It can thereby be essentially guaranteed that the membrane spring 7 always works in the same range of forces, the actuation forces are essentially always on the same level, and the torque transmission capability of the friction clutch 1 can be defined and preserved.

In other words, and in accordance with one embodiment, when wear occurs to the linings 23 and the application plate 4 moves closer to the flywheel 2 than was previously the case when no wear had occurred, a space can be formed between the inner end of the actuator lever 12 and a base portion 25a (see FIG. 2a) of recess 25. Thus, the actuator lever 12 loses contact with the base 25a while the friction clutch 1 is engaged with the flywheel 2. When the membrane spring 7 releases the application plate 4, the spring 21 can thus cause the ring element 18 to move and to widen the space initially occupied by the ring element 18. Thus, the inner end of the actuator lever 12 regains contact with the base 25a of the recess.

Figure 4:
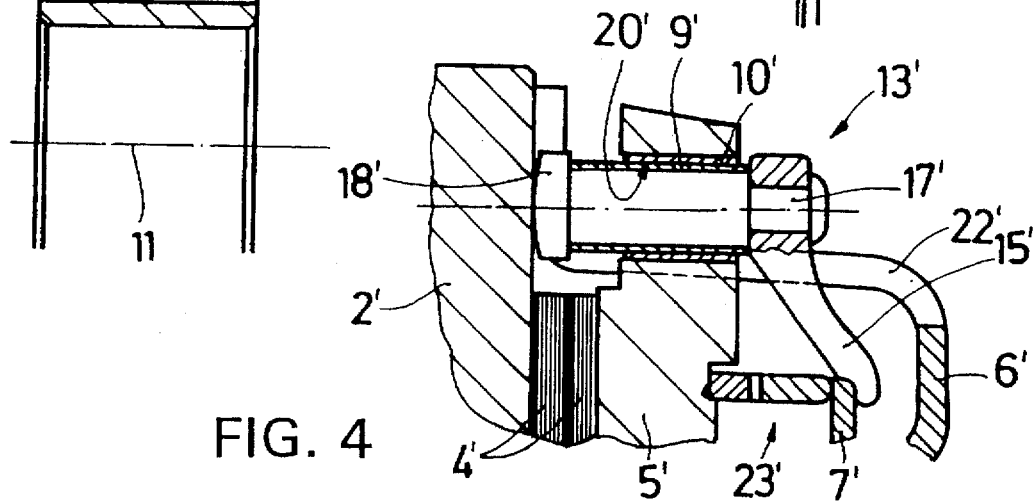

It also bears mentioning that the radially inner terminal areas of the actuator lever 12 can also be located so that they are in contact with the side of the membrane spring 7 farther from the flywheel 2, and thus control the adjustment movement of the ring element 18 only indirectly. In such a realization, the actuator levers 12 can simultaneously effect the forcible release movement of the application plate 4 during the release process. The other functions remain unchanged. An example of this type of configuration is shown in FIG. 4. Instead of a ring element 18, two ring elements 18 and 18a can also be installed one behind the other in the axial direction, whereby the ring elements 18, 18a each have partial surfaces 20 and corresponding matching surfaces facing one another, and the spring 21 applies its force to both ring elements 18, 18a, with regard to a relative rotation of the two ring elements 18, 18a in relation to one another. However, as mentioned hereinabove, it can also be possible, essentially without any additional measures, to make do with only one ring element 18, in which case the matching surfaces for the partial surfaces 20 can be located either in the application plate 4 or in the membrane spring 7.

In a particularly simple manufacturing process, the ring element 18 can be stamped out of a strip of sheet metal, bent into a ring, and used, as in the illustrated example, in the form of an open ring. However, if the guide diameter 22 of the application plate 4 is designed as an outside diameter, the ring element 18 can preferably be advantageously closed on its periphery. As a result of the ability to make the ring element 18 relatively rigid in spite of its simple construction, in most cases the desired function can be performed with a single clearance sensor 9. Essentially only in exceptional cases might it be necessary to provide two clearance sensors 9 distributed over the periphery.

The disclosure now turns to additional embodiments of wear compensators. It should be understood that the material found hereinbelow is presented only as background information for the present invention, and that the components discussed herebelow with reference to FIGS. 3–7a may be considered to be interchangeable with similar components discussed hereinabove.

Figure 3:
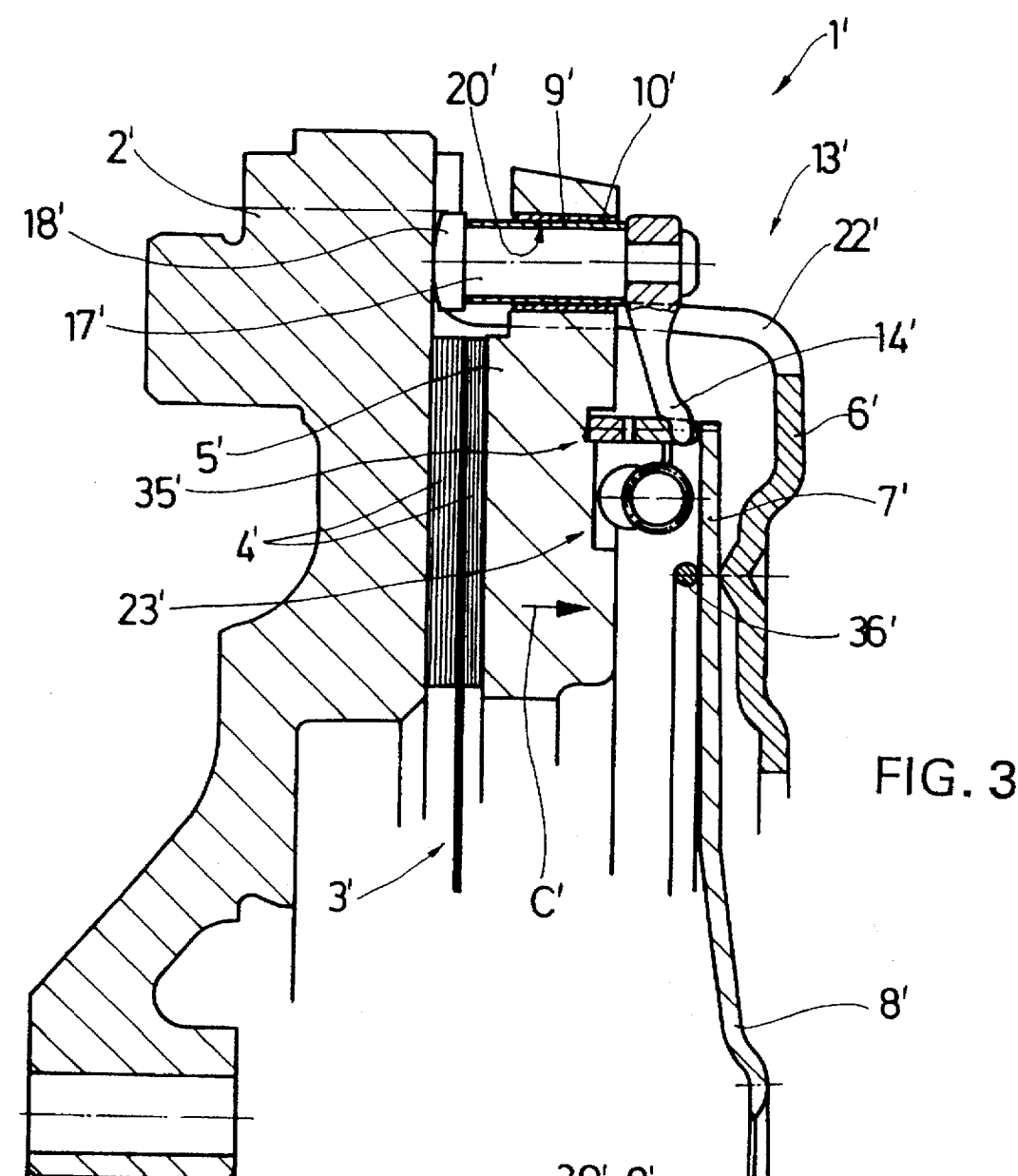
FIG. 3 shows the upper half of a longitudinal section through a friction clutch.

FIG. 3 shows the upper half of a longitudinal section through a friction clutch 1', which, in the depicted embodiment, can be designated as a "pushed" friction clutch. A flywheel 2' can preferably be fastened to a crankshaft (not shown) of a motor vehicle, and can rotate, along with friction clutch 1', around a common axis of rotation 11'. Fastened to the flywheel 2' there can typically be a clutch housing 6', in which a pressure or thrust plate 5' can be fastened non-rotationally. The pressure plate 5' can preferably be axially movable within the housing 6'. The non-rotational connection of the pressure plate 5' to the clutch housing 6' can preferably be provided by means of tangential leaf springs which are not shown in the drawing, but which are generally well known and will not be further discussed here. Further, other types of connections might also be possible.

Between the thrust plate 5' and the flywheel 2', a clutch disc 3' with friction linings 4' can preferably be disposed. The clutch disc 3', with its friction linings 4', can preferably be attached to a transmission shaft (not shown), for example, by means of teeth which can preferably engage with splines or teeth of the transmission shaft. Further, the clutch disc 3' can preferably be clamped between the pressure plate 5' and the flywheel 2' in order to engage the transmission shaft (not shown) with the flywheel 2'. The clamping force can preferably be applied by a membrane spring 7', which can preferably be located on the inside of the clutch housing 6'. The membrane spring 7' can preferably be fixed, on an intermediate diameter, by means of spacer bolts (not shown), and can be supported on one hand on the clutch housing 6' in the vicinity of an area 36a' of the clutch housing 6' (see FIG. 3a), and on the other hand on a wire ring 36'. Radially inward, the membrane spring 7' can be provided with flexible tabs 8', and the membrane spring 7' can be supported in a radially outer portion 7a' (see FIG. 3a) by means of an adjustment device 23', which adjustment device 23' can preferably be disposed on the thrust plate 5'. The design of the adjustment device 23' is shown in more detail in FIGS. 5, 6, 5a, and 6a.

The thrust plate 5' can preferably be provided on the circumference, in one or more positions about the circumference, with holes 20', the longitudinal axes of which holes 20' preferably run substantially parallel to the axis of rotation 11'. These holes 20' can be represented, for example, by a bushing 10' preferably located in the thrust plate 5'. In each hole 20' a sliding pin 17' preferably extends, which sliding pin 17' can preferably be provided with a head 18', outside the hole 20', in the vicinity of the flywheel 2'. Each sliding pin 17' can also preferably have an actuator lever 14' on the other end thereof. This actuator lever 14' can preferably extend outside of the hole 20', and also substantially perpendicular to the hole 20'. The actuator lever 14' and the sliding pin 17' can be permanently connected to one another, and the actuator lever 14' can preferably extend radially inward and through a hole 22' in the clutch housing 6'.

When the friction clutch 1' is engaged, and when there is no wear of the friction linings 4', each sliding pin 17' preferably lies with its head 18' on an area of the flywheel 2', and each actuator lever 14' can preferably be in contact with a component of the adjustment device 23'. Each sliding pin 17' can preferably be surrounded by an adapter sleeve 9', which adapter sleeve 9' is preferably in frictional contact with the hole 20', more particularly bushing 10' in hole 20', and is preferably under radial internal stress in the hole 20' of the bushing 10'. The adapter sleeve 9' can preferably be provided with a slight clearance with respect to the sliding pin 17' both radially and axially, so that the function of the adapter sleeve 9' can essentially not be influenced by the sliding pin 17'.

Figure 3A:
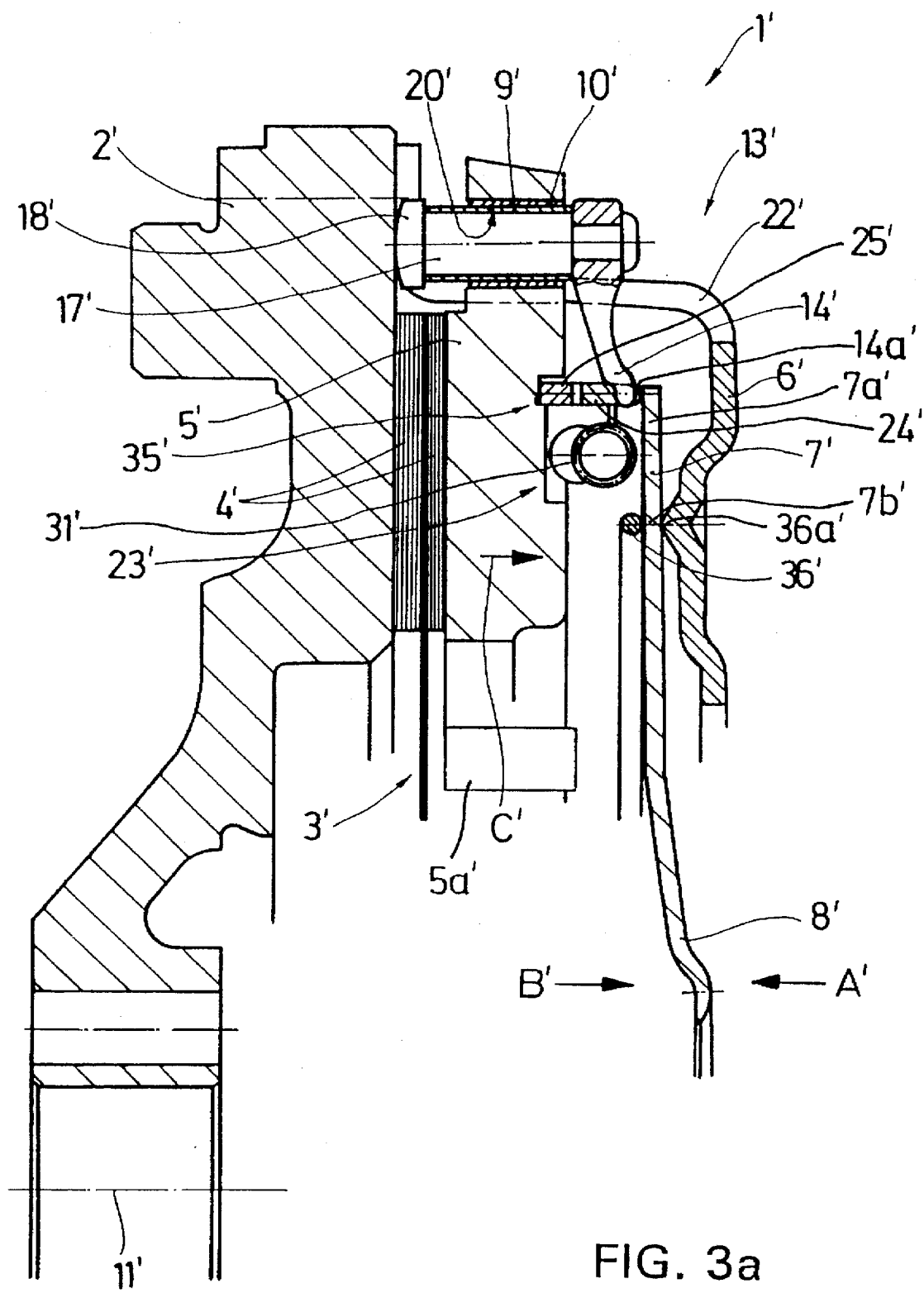
FIG. 3a shows substantially the same view as FIG. 3, but is more detailed.
Figures 5, 6:
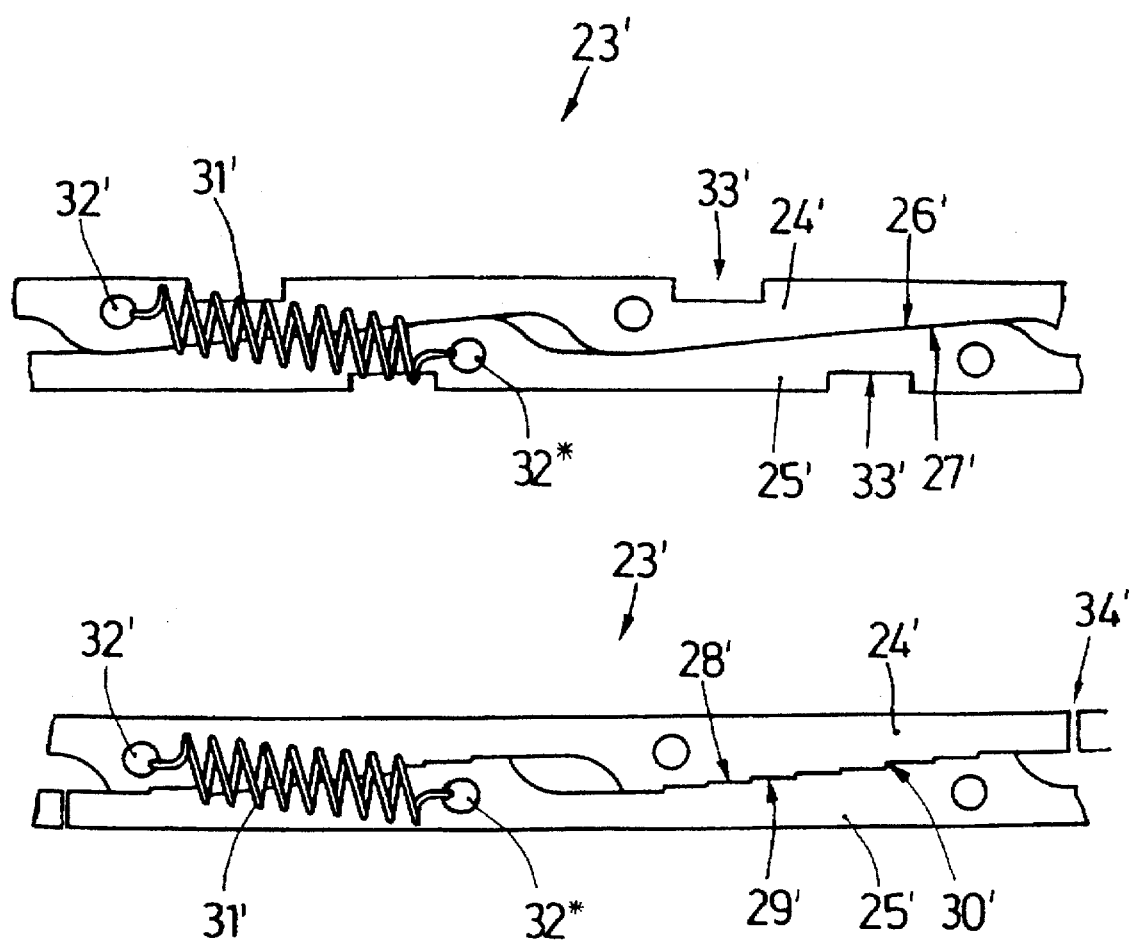
FIGS. 5 and 6 show two partial views of two variants of an adjustment device.

The adjustment device 23' is illustrated in further detail in FIGS. 5, 6, 5a and 6a, which show two possible embodiments of the adjustment device 23'. FIG. 5 shows an adjustment device 23' which is preferably inserted into the friction clutch 1' as illustrated in FIGS. 3 and 3a. The adjustment device 23' can generally include two rings 24' and 25', which rings 24' and 25' can preferably be made of sheet metal, and which rings 24' and 25' can preferably be in axial contact with one another by means of diagonal, or sloped, partial surfaces 26' and 27', respectively. The two rings 24' and 25' can preferably be provided with openings 32' and 32*, in which the respective ends of a tension spring 31' can preferably be suspended. The tension spring 31' is preferably tensioned to twist the two rings 24' and 25' in opposite directions in relation to one another, so that by means of the partial surfaces 26' and 27', it is possible to increase the axial distance occupied by the two rings 24' and 25'.

The rings 24' and 25', within the clutch housing 6', are preferably oriented substantially concentrically to the axis of rotation 11' on a guide diameter 35' (see FIGS. 3 and 3a) of the thrust plate 5'. When the friction clutch 1' is engaged, the rings 24' and 25' preferably fill the axial space between the thrust plate 5' and the external contour of the membrane spring 7'. At least the ring 24', which is disposed nearest the membrane spring 7', can preferably be provided with recesses 33' into which the ends of the actuator levers 14' can preferably extend. The depth of the recesses 33', preferably in all cases, should be greater than the axial extension of the ends of the actuator levers 14', preferably so that a clearance 14a' (see FIG. 3a) can be maintained between the levers 14' and the membrane spring 7'. It is desirable that such a clearance 14a' be greater than the maximum wear of the friction linings 4' during one clutch engagement process, so that the rings 24' and 25' can be moved as a result of the wear of the linings 4' while lever 14' stays substantially in place.

In other words, the recesses can preferably have a width dimension 33a' (see FIG. 5a), which extends substantially parallel to the axis of rotation 11' when the rings 24' and 25' are installed in the clutch 1', as shown in FIGS. 3 and 3a. This width dimension 33a' should be greater than an axial width of the actuator levers 14', and also greater than the maximum axial wear distance of the friction linings 4' during one clutch engagement.

It is naturally of practical advantage, from a manufacturing point of view and from an assembly point of view, if the two rings 24' and 25' are identical to one another, so that both are provided with recesses 33', even if the recesses 33' are only necessary for one ring, such as ring 24'. Thus, essentially, no particular attention to the orientation of the rings 24' and 25' would be necessary during assembly.

The operation of the friction clutch 1' in connection with the rings 24' and 25' of the adjustment device 23' is given herebelow. During the assembly of the friction clutch 1', the sliding pin or pins 17' are preferably assembled together with the adapter sleeves 9' so that when the friction clutch 1' is engaged, the heads 18' of the sliding pins 17' preferably come into contact with the flywheel 2'. In this engaged state, as illustrated in FIGS. 3 and 3a, the friction linings 4' are preferably pressed by the thrust plate 5' against the flywheel 2', the sliding pins 17' are in contact with the flywheel 2', and the rings 24' and 25' of the adjustment device 23' are preferably in contact on one side with the thrust plate 5', and on the other side with the membrane spring 7'. The free space between the actuator lever 14' and the thrust plate 5' is essentially completely occupied by the two rings 24' and 25'.

If the friction clutch 1' is released or disengaged, force is exerted on the flexible tabs 8' of the membrane spring 7', preferably by means of a clutch release system which is not shown here, but an example of which is shown and described further below with reference to FIG. 9. The release force preferably takes place in the direction of Arrow A' in FIG. 3a, i.e. towards the flywheel 2'. Consequently, the membrane spring 7' can preferably tip around a support point 7b' (see FIG. 3a) in the vicinity of the wire ring 36', so that the outside circumference 7a' of the membrane spring 7' can be moved away from the flywheel 2'.

The friction clutch 1' can also preferably have a release spring device, one example of which spring device is shown schematically in FIG. 3a as indicated by reference number 5a'. Such a spring device 5a' can preferably exert a force in the direction indicated by Arrow C' on the thrust plate 5'. As such, the thrust plate 5', the adjustment device 23' and the clearance sensor 13', including the sliding pin 17', the actuator lever 14' and the adapter sleeve 9', can simultaneously carry out the release process of the friction clutch 1'.

The engagement process essentially takes place in the opposite direction. That is, to engage the clutch 1', force is preferably exerted on the flexible tabs 8' in a direction of Arrow B' (see FIG. 3a), or force A' can simply be released. If, during the engagement process, wear occurs to the friction linings 4', the position of the thrust plate 5' will typically be reset a slight distance toward the flywheel 2', preferably by the force of the membrane spring 7' with the interposition of the two rings 24' and 25'. The distance will typically be by an amount of the wear of the friction linings 4'. But, since the position of the clearance sensors 13' is preferably set in contact with the flywheel 2', when there is no wear of the friction linings 4', preferably by means of the heads 18' of the sliding pins 17', the membrane spring 7', by its force, can preferably effect a relative displacement between the thrust plate 5' and the sliding pins 17' with the adapter sleeves 9'. In other words, the sliding pins 17' will remain in place, in contact with the flywheel 2', while the membrane spring 7' pushes pressure plate 5' to the left in FIGS. 3 and 3a, and, since the force of membrane spring 7' can preferably be a strong force, membrane spring 7' preferably overpowers the frictional engagement of the sliding pin 17' in the bearing 10'. Thus, all of the actuator levers 14' therefore will now be spaced apart from their contact position on the ring 24' by the amount of the wear of the linings 4'.

In other words, the actuator levers 14', which are preferably disposed in the recesses 33' of the ring 24', preferably lose their previous axial contact with the base 33b' (see FIG. 5a) of the recesses 33'. Then, during the subsequent release process of the friction clutch 1', the radially outer portion 7a' of the membrane spring 7' preferably moves away from the flywheel 2', and the tension springs 31' of the adjustment device 23' therefore cause a relative rotation of the two rings 24' and 25' against one another to move ring 24' back into axial engagement with the lever 14'. Thus, it can essentially be guaranteed that the increased space between the thrust plate 5' and the actuator lever 14' in the axial direction, due to the wear of the friction linings 4' is once again filled up. Preferably, the axial filling occurs first, and then from the moment this space is filled up by the two rings 24' and 25' the thrust plate 5', together with the clearance sensors 13', can be lifted away from the flywheel 2', so that the clutch disc 3' can preferably be released.

During this release process, care should be taken that the spring force applied by the release device 5a', which release device 5a' preferably acts on the thrust plate 5' in the direction indicated by the Arrow C', does not interfere with the relative rotation between the two rings 24' and 25' of the adjustment device 23'. In other words, care should be taken that the release device 5a', which acts on the pressure plate 5' in direction C', provides only a slight release force in the direction of arrow C' so as not to overpower the force of spring 31', which spring 31' preferably causes the rings 24' and 25' to move and adjust for the wear of the friction linings 4', thereby enabling spring 31' to move rings 24' and 25' first, before further release of the pressure plate 5' from the flywheel 2'.

Figure 5A:
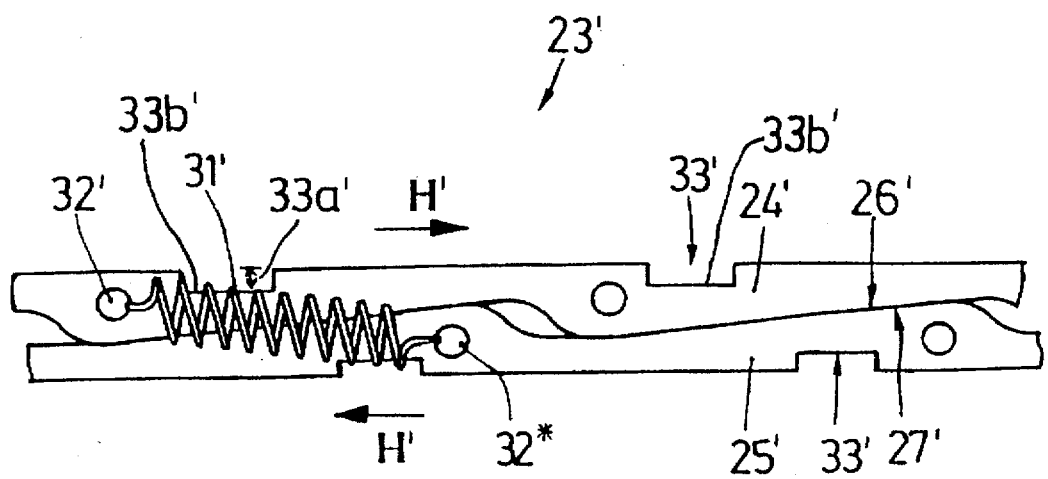
FIGS. 5a and 6a show substantially the same views as FIGS. 5 and 6, respectively, but are more detailed.
Figure 6A:
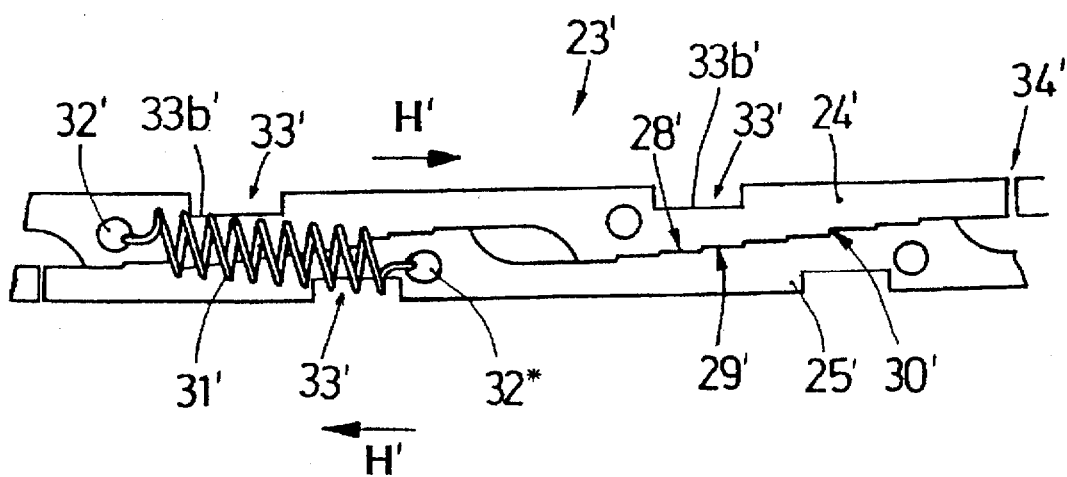

The spring 31' preferably biases the springs 24' and 25' in the directions indicated by the Arrows H' shown in FIGS. 5a and 6a.

Figure 4A:
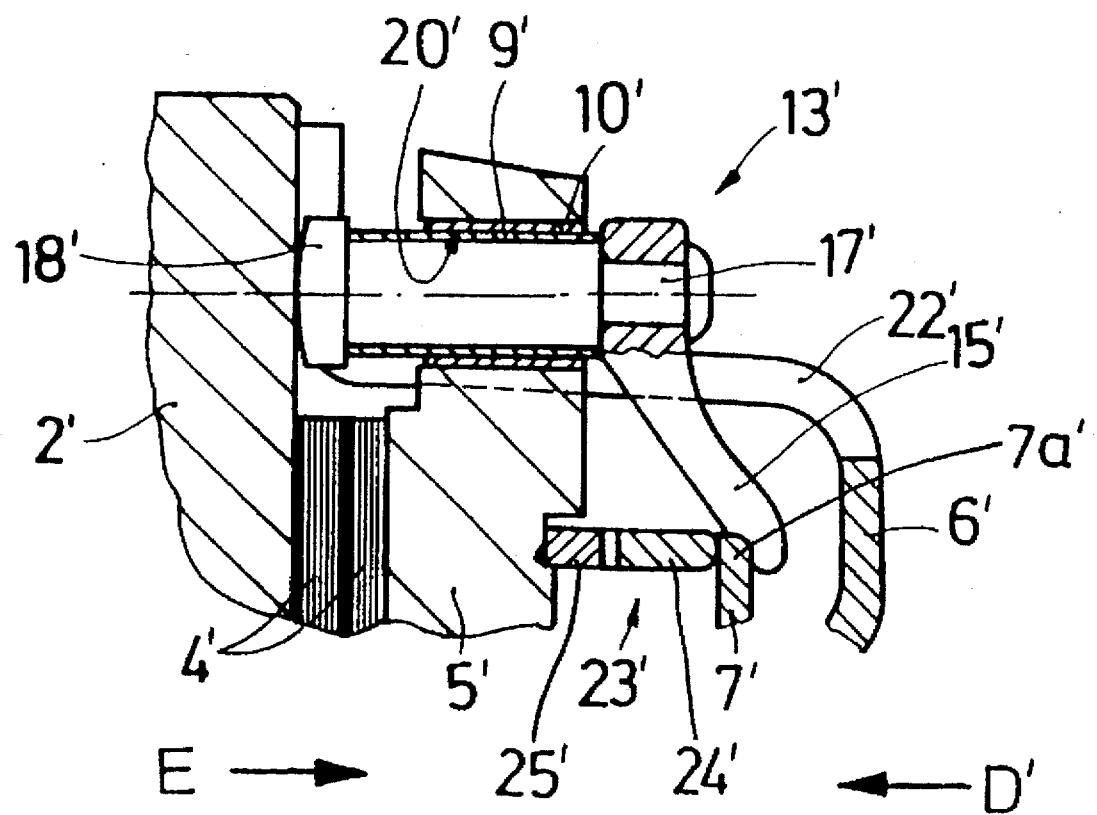
FIG. 4a shows substantially the same view as FIG. 4, but is more detailed.

An additional embodiment is illustrated in FIGS. 4 and 4a, in which an actuator lever 15' of the clearance sensor 13' preferably does not act directly on one of the rings 24', 25' of the adjustment device 23', but instead acts on the radially outside edge 7a' (see FIG. 4a) of the membrane spring 7'. In accordance with this embodiment, the membrane spring 7' is preferably interposed between ring 24' and the actuator lever 15'. The other elements of the embodiment shown in FIGS. 4 and 4a are essentially identical to those illustrated in FIGS. 3 and 3a. As a result of this special configuration, the clearance sensors 13' can preferably simultaneously function as the mandatory releasing device for the thrust plate 5', in which case, when the membrane spring 7' is actuated to release, the membrane spring 7' preferably moves all the clearance sensors 13' with the sliding pins 17' into the release position.

In other words, as shown in FIGS. 4 and 4a, a releasing device similar to the releasing device 5a' as shown in FIG. 3a may not be necessary in that the membrane spring 7' can preferably act as a releasing device for the pressure plate 5'. Since the membrane spring 7' preferably acts directly on the lever 15', when the membrane spring 7' is released and the outer portion 7a' (see FIG. 4a) of the membrane spring 7' is moved in the direction indicated by Arrow E', the lever 15' can preferably move along with the membrane spring 7' to the right. Further, as the lever 15' moves to the right with the membrane spring 7', lever 15' can cause the pressure plate 5' to also move to the right and to disengage from the flywheel 2', preferably by means of the frictional connection between the sliding pin 17' and the bearing 10'. Thus, the clearance sensors 13' can also function as the releasing device for the pressure plate 5' in the direction indicated by Arrow E'.

In the event of an engagement process accompanied by wear of the friction linings 4' as shown in FIGS. 4 and 4a, the magnitude of the wear will essentially appear as a gap between the radially outer portion 7a' (see FIG. 4a) of the membrane spring 7' and the actuator lever 15'. During the subsequent release process, that is, during the movement of the membrane spring 7' toward the actuator lever 15', preferably after a force has been applied to the tongues (not shown here) of the membrane spring 7' in the direction indicated by Arrow D', as a function of this wear, the two rings 24' and 25' of the adjustment device 23' are preferably correspondingly repositioned by the tension spring 31', preferably so that there is no longer any clearance between the thrust plate 5', the rings 24' and 25', the membrane spring 7' and the actuator lever 15'.

Further, the friction clutch shown in partial section in FIGS. 4 and 4a could be considered to be a "pushed" clutch, similar to the friction clutch 1' shown in FIGS. 3 and 3a. Thus, in FIGS. 4 and 4a, the releasing motion is preferably in the direction indicated by the Arrow D', and the engaging motion is preferably in the direction indicated by the Arrow E'.

Figure 7:
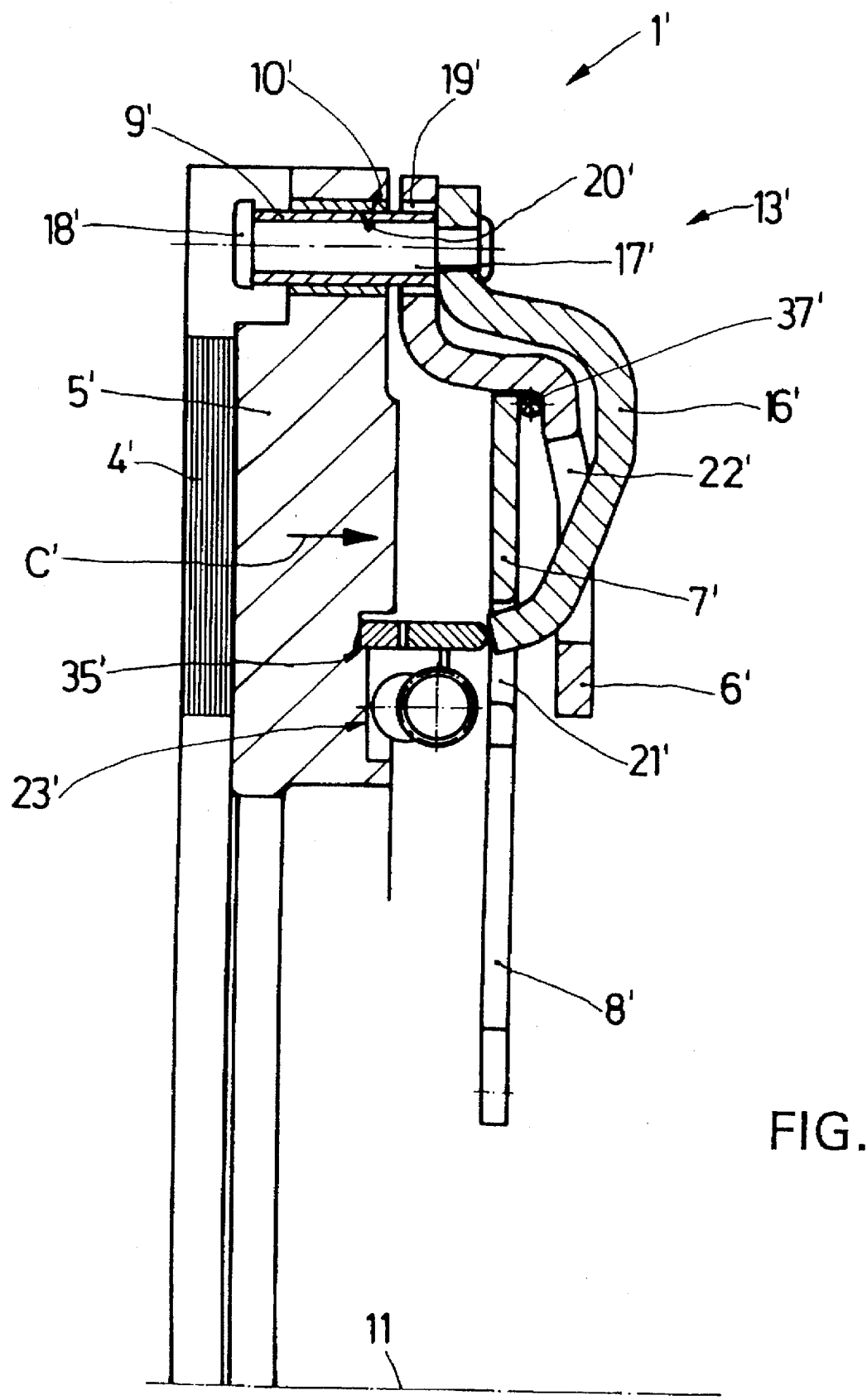
FIG. 7 shows the upper half of a longitudinal section through a friction clutch of the "pulled" type.

FIG. 7 illustrates one type of friction clutch 1' which typically can be considered to be a "pulled" friction clutch. On this "pulled" friction clutch, the membrane spring 7' is preferably supported in the vicinity of its outside circumference 7a' (see FIG. 7a) preferably by means of a wire ring 37' on the clutch housing 6'. The membrane spring 7', preferably by means of an intermediate diameter, can preferably actuate the thrust plate 5'. The flexible tabs 8' preferably extend radially inward, and are preferably pulled away by means of a release system not shown here, but an example of which is shown in FIG. 9, during the release process preferably in the direction indicated by the Arrow C'. On this "pulled" friction clutch 1', the axial stop can also be located between the clearance sensors 13' and an element which is integral to the housing 6', so that the individual actuator levers 16' come into contact with the outside of the clutch housing 6'. Thus, essentially, the function of the heads 18' of the sliding pins 17' preferably is to connect the adapter sleeves 9' in the axial direction without fixed clamping to the clearance sensors 13'. Further, the heads 18' of the sliding pins 17' preferably do not contact the flywheel (not shown) as compared to the embodiments shown in FIGS. 3 through 4a.

In the illustrated engaged state of the friction clutch 1', the membrane spring 7', by means of the rings 24' and 25' of the adjustment device 23', preferably applies pressure to the thrust plate 5', and thus clamps the friction linings 4' between the thrust plate 5' and the flywheel (not shown here). In the engaged state, essentially all of the clearance sensors 13' are displaced toward the flywheel (not shown) so that the actuator levers 16' preferably come into contact with the housing 6', and the axial space between the radially inside ends 16a' (see FIG. 7a) of the actuator levers 16' and the thrust plate 5' can be essentially completely filled up by the two rings 24' and 25'. The two rings 24' and 25' can thereby be guided in a known manner on a guide diameter 35' of the thrust plate 5'. Since there is preferably no forced release, there can preferably also be a releasing device 5a' (see FIG. 7a) which supplies a release force which preferably exerts pressure on the thrust plate 5' in the direction indicated by the Arrow C'.

Each actuator lever 16' preferably runs from outside of the clutch housing 6', through corresponding openings 22' in the clutch housing 6', and through corresponding openings 21' in the membrane spring 7'. The openings 22' can thereby also function to prevent the actuator levers 16' from twisting. By means of corresponding openings 19' in the clutch housing 6', preferably in the vicinity of the sliding pins 17', the clutch housing 6' essentially has no adverse effect on the axial displacement of the clearance sensors 13'. In the event of an engagement process accompanied by wear, the thrust plate 5' is preferably moved closer to the flywheel (not shown here) by the force of the membrane spring 7', and, simultaneously, the clearance sensors 13' are preferably held essentially stationary by the clutch housing 6', and the thrust plate 5' can thus execute a relative motion with respect to the clearance sensors 13'. The radially inward ends 16a' (see FIG. 7a) of the actuator levers 16' can thereby be lifted from the corresponding ring, preferably ring 24' of the adjustment device 23', by the magnitude of the wear.

During the next engagement process, first there preferably is repeated equalization of the distance between the thrust plate 5' and the actuator levers 16', by means of relative rotation of the two rings 24' and 25' due to the force of the tension springs 31', and then the releasing process typically begins. In this case, care must also be taken that the force of the releasing device 5a' (see FIG. 7a) essentially does not interfere with the axial movement during the rotation of the two rings 24' and 25'. In other words, care should be taken to ensure that the releasing device 5a' does not overpower the force of the spring 31' which moves the rings 24' and 25' with respect to one another.

Figure 7A:
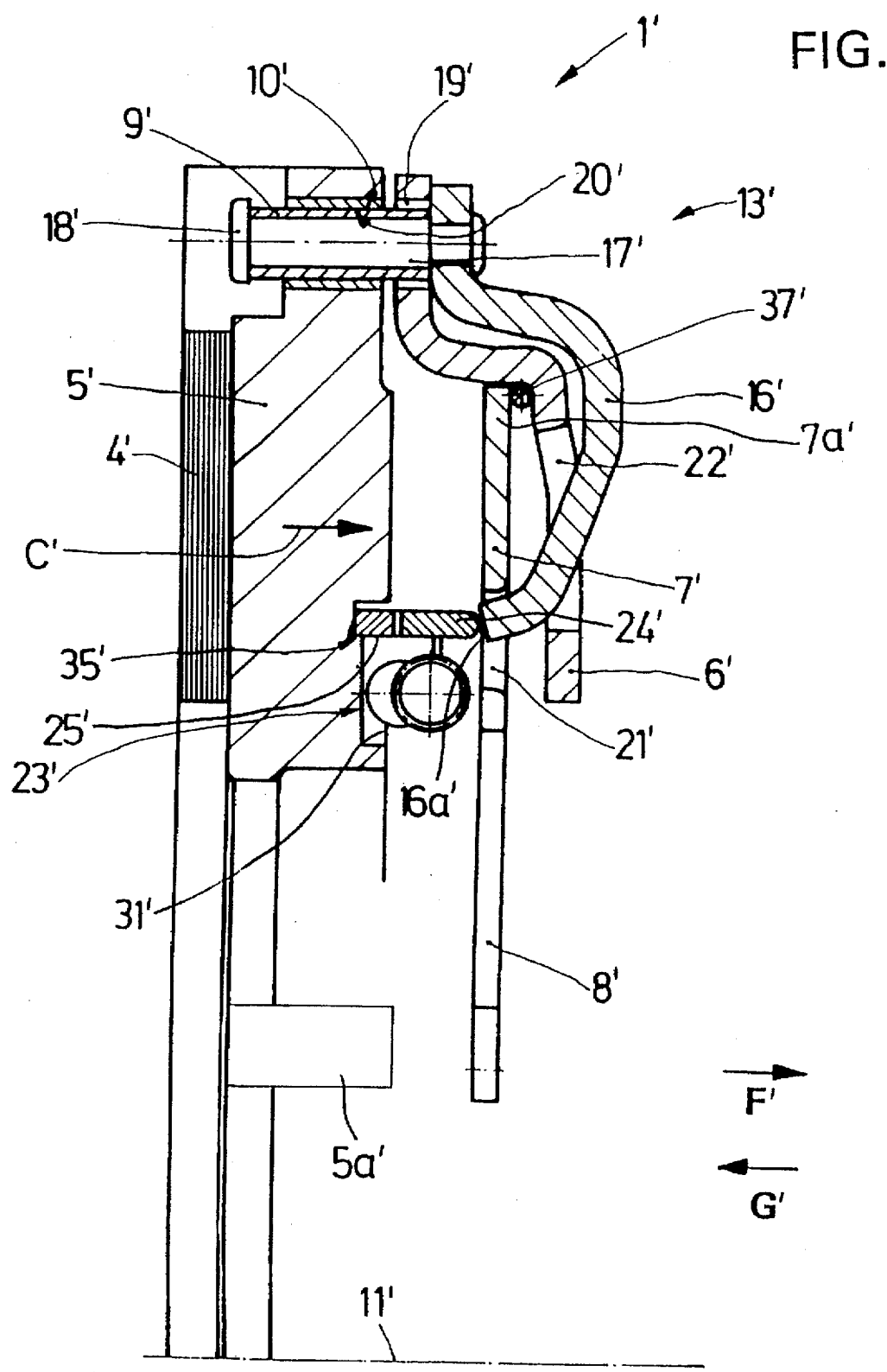
FIG. 7a shows substantially the same view as FIG. 7, but is more detailed.

As shown in FIG. 7a, the releasing force on the membrane spring 7' preferably takes place in the direction as indicated by arrow F'. Oppositely, the engaging force will typically take place in the direction as indicated by arrow G'.

FIG. 6 shows one particular embodiment of the partial surfaces 28' and 29' between the two rings 24' and 25'. In the illustrated embodiment, the partial surfaces 28' and 29' can preferably comprise numerous individual partial pieces. Each of the partial pieces preferably extend in a stepped fashion and parallel to a plane perpendicular to the axis of rotation 11'. As a result of this design, neither the spring device, in the form of the tension springs 31', nor the application force of the membrane spring 7' can cause a circumferentially-directed force component which could push both rings 24' and 25' in either direction of rotation. But, this design can also realize a not-altogether-continuous adjustment for wear, since first there must be wear which is somewhat greater than the height of the step 30'. In practice, this height has been determined to be approximately 0.2 mm, for example. Of course, slight variations of this dimension may be possible, and the height of the step 30' should not be taken as limited to this value.

Further, the rings 24' and 25', as embodied in FIGS. 6 and 6a, can preferably be open at an area on their circumference, and therefore can have a gap 34'.

As shown in FIG. 6a, the rings 24' and 25' could have recesses 33' similar to those shown in FIGS. 5 and 5a.

The purpose of the bushing 10' inserted into the thrust plate 5' preferably is to preserve the friction characteristics with respect to the adapter sleeve 9' over the life of the friction clutch 1'. For this purpose, the bushing 10' can be made of brass, bronze, plastic or a composite material, for example. Of course, other materials may be appropriate.

One feature of the invention resides broadly in the motor vehicle friction clutch with automatic wear adjustment for the pressure plate which is fastened to a flywheel with the interposition of a clutch disc with friction linings, and together with the flywheel forms an axis of rotation, comprising an application plate which is fastened in a clutch housing non-rotationally but so that it can move axially, a membrane spring installed with bias between the application plate and the clutch housing, which membrane spring, in the vicinity of its outside periphery and in an area with a smaller diameter, is supported both on the clutch housing and also on a contact area on the application plate, whereby the contact occurs with the interposition of an adjustment device which makes possible an axial displacement of the application plate away from the membrane spring as a function of the wear of the friction linings of the clutch disc, characterized by the fact that located on the pressure plate there is at least one clearance sensor 9 which acts directly or indirectly by means of an actuator lever 12 which points radially inward on a component of the adjustment device 18, 18a, that the clearance sensor 9 can be displaced axially in a boring 24 which is oriented parallel to the axis of rotation 3 in the application plate 4 and can be arrested, held in place, or locked by means of friction, the clearance sensor 9 has an axial stop 2, 15 which is non-detachably connected to the housing, which axial stop 2, 15 limits the movement of the clearance sensor 9 toward the flywheel 2, and during the release procedure following the occurrence of the wear, the adjustment device 18, 18a penetrates into the increased distance between the clearance sensor and the application plate, whereby the adjustment device consists of at least one ring element 18 which is oriented concentric to the axis of rotation 3 and is in encircling contact with a guide diameter 22 of the application plate 4, is rigid in the axial direction, has on one end partial surfaces 20 which produce an axial inclination, and pressure is applied to it by a spring device 21 in the peripheral direction in the sense of a rotation and thus an axial enlargement of the installation space.

Another feature of the invention resides broadly in the friction clutch characterized by the fact that the matching partial surfaces can be located in the application plate 4, in the membrane spring 7 or in a second ring element 18a which is in axial alignment with the first ring element 18.

Yet another feature of the invention resides broadly in the friction clutch characterized by the fact that the ring element 18, 18a has a rectangular cross section, whereby the longer edge is guided parallel to the axis of rotation 3 on a guide diameter 22 of the application plate 4.

Still another feature of the invention resides broadly in the friction clutch characterized by the fact that pressure is applied to each clearance sensor 9 by a spring 14 so that it is arrested in the opening 24 of the application plate 4.

A further feature of the invention resides broadly in the friction clutch characterized by the fact that the spring 14 is supported on the actuator lever 12 and on the application plate 4.

Another feature of the invention resides broadly in the friction clutch characterized by the fact that pressure is applied to each clearance sensor 9 in the vicinity of the opening 24 by a spring 13 in the sense of an axial displacement toward the flywheel 2.

Yet another feature of the invention resides broadly in the friction clutch characterized by the fact that the clearance sensor 9 is guided by means of a sliding pin 10 which runs parallel to the axis of rotation 3 in a boring 24, and the spring 13 is oriented concentrically around the sliding pin 10 and is in contact on one hand with the application plate 4 and on the other hand with the sliding pin 10.

Still another feature of the invention resides broadly in the friction clutch characterized by the fact that each clearance sensor 9 has a fixing device to prevent twisting in the opening which is preferably realized in the form of a boring or hole 24, in the form of a pin 11 which is parallel to the hole 24 and at some radial distance from it.

A further feature of the invention resides broadly in the friction clutch characterized by the fact that the second spring 14 is located concentrically around the pin 11 and applies pressure to the actuator lever away from the application plate.

Types of clutch assemblies which have wear sensors or adjustment mechanisms for detecting and adjusting for the wear of the friction linings of a clutch may be disclosed by the following U.S. Pat. Nos. 4,191,285 to Thelander et al. on Mar. 4, 1980, entitled "Wear Compensator for Belleville Spring Clutch"; No. 5,238,093 to Campbell on Aug. 24, 1993, entitled "Wear Indicator for Adjustable Clutch"; No. 4,953,680 to Flotow on Sep. 4, 1990, entitled "Clutch Adjuster"; No. 4,549,643 to Flotow et al. on Oct. 29, 1985, entitled "Self Adjusting Device for a Friction Clutch"; No. 4,310,086 to Mochida on Jan. 12, 1982, entitled "Automatic Adjusting Device for a Clutch Operating Mechanism"; and No. 4,285,424 to Sink et al. on Aug. 25, 1981, entitled "Locking Device for a Friction Type Clutch".

Types of manual transmissions in which the present invention may be incorporated may be disclosed by the following U.S. Pat. Nos. 5,036,721 to Gugin on Aug. 6, 1991, entitled "Shift Control Mechanism for a Manual Transmission"; No. 4,222,283 to Nagy on Sep. 16, 1980, entitled "Manual Transmission Lubrication System"; No. 3,858,460 to Porter et al. on Jan. 7, 1975, entitled "Four Speed Manual Transmission and Control"; and No. 5,269,400 to Fogelberg on Dec. 14, 1993, entitled "Transmission Synchronizer".

Types of clutch assemblies in which the present invention may be incorporated may be disclosed by the following U.S. Pat. Nos. 4,635,780 to Wiggen on Jan. 13, 1987, entitled "Clutch Disc for a Motor Vehicle Friction Clutch"; No. 4,684,007 to Maucher on Aug. 4, 1987, entitled "Clutch Plate"; No. 4,433,771 to Caray on Feb. 28, 1984, entitled "Torsion Damping Device for a Clutch Plate"; and No. 4,099,604 to Higgerson on Jul. 11, 1978, entitled "Friction Clutch with Integral Adjuster".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 195 06 698.7, filed on Feb. 25, 1995, having inventors Achim Link and Reinhold Weidinger, and DE-OS 195 06 698.7 and DE-PS 195 06 698.7 are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising:

a clutch housing;

a clutch disc disposed within said housing, said clutch disc defining an axis of rotation and an axial direction parallel to the axis of rotation;

said clutch disc for being disposed on a transmission input shaft;

a pressure plate for engaging and disengaging said clutch disc with a flywheel of an internal combustion engine;

said clutch disc being disposed between said pressure plate and the flywheel, said clutch disc comprising friction lining means for contacting the flywheel and said pressure plate upon engagement of said friction clutch;

first means for biasing said pressure plate towards the flywheel, said first biasing means being disposed between said clutch housing and said pressure plate;

means for adjusting the axial distance between said pressure plate and said first means for biasing upon wear of said friction lining means;

at least one means for sensing wear of said friction lining means, said at least one sensing means comprising:

projection means, said protection means comprising:
a first portion extending towards said adjusting means;
said first portion being operatively connected to said adjusting means to permit said adjusting means to adjust the axial distance between said pressure plate and said first means for biasing during a disengagement
process of said friction clutch, which disengagement process follows an engagement process of said friction clutch wherein wear of said friction lining means has occurred; and
a second portion disposed in said pressure plate;
means for providing friction for frictionally positioning said second portion with respect to said pressure plate, said means for providing friction comprising means for permitting sliding axial movement, against said friction, of at least one of: said pressure plate, and said at least one sensing means, one with respect to the other;
said at least one sensing means comprising means for receiving said second portion of said projection means, said means for receiving being disposed in said pressure plate;
said means for receiving comprising a bore, said bore having a longitudinal axis defined substantially parallel to the axis of rotation;
said at least one sensing means comprising means for limiting movement of said at least one sensing means towards the flywheel; and
said means for providing friction comprising second means for biasing said first portion away from said pressure plate.

2. The friction clutch according to claim 1 wherein said second biasing means is disposed between said first portion of said at least one sensing means and said pressure plate.

3. The friction clutch according to claim 2 wherein:
said adjusting means comprises:
at least one ring element disposed substantially concentrically with respect to the axis if rotation, and being further disposed between said first biasing means and said pressure plate; and
said at least one ring element comprises at least one portion having a sloped surface disposed to face one of: said pressure plate and said first biasing means.

4. The friction clutch according to claim 3 wherein said at least one ring element comprises a rigid material.

5. The friction clutch according to claim 4 wherein:
said first portion of said at least one sensing means and said pressure plate together define a space therebetween;
said space having a first dimension defined parallel to the axis of rotation when no wear has occurred on said friction lining means, and a second dimension defined parallel to the axis of rotation upon wear of said friction lining means wherein said pressure plate has moved closer to the flywheel by the amount of said wear;
said second dimension being greater than said first dimension;
said at least one portion having said sloped surface being disposed in said space;
said at least one portion having said sloped surface having a plurality of dimensions defined parallel to the axis of rotation, each one of said plurality of dimensions being greater than an adjacent one of said plurality of dimensions to form said sloped surface; said adjusting means further comprises:

third means for biasing said at least one ring element to rotate with respect to at least one of: said first biasing means and said pressure plate;
said third biasing means being configured to move a portion of said sloped surface having a greater one of said plurality of dimensions into said space having said second dimension upon wear of said friction lining means.

6. The friction clutch according to claim 5 wherein:
said pressure plate has an outer circumference and an inner circumference disposed within said outer circumference, said bore being disposed in said outer circumference; and
said at least one sensing means further comprises a spring disposed adjacent said bore, said spring for biasing said at least one sensing means towards the flywheel.

7. The friction clutch according to claim 6 wherein:
said second portion comprises a pin disposed in said bore, said pin having a first end disposed adjacent the flywheel and a second end disposed adjacent said first portion;
said first portion comprises a lever, said lever having a first end disposed adjacent said adjusting means and a second end disposed adjacent said pin; and
said second end of said pin is fixedly attached to said second end of said lever.

8. The friction clutch according to claim 7 wherein:
said pin extends in a direction substantially parallel to the axis of rotation; and
said spring is disposed about said pin, said spring contacting said pressure plate and said first end of said pin.

9. The friction clutch according to claim 8 wherein said at least one sensing means further comprises means for preventing rotational movement of said at least one sensing means with respect to said bore.

10. The friction clutch according to claim 9 wherein:
said pin is a first pin;
said spring is a first spring;
said means for preventing comprises:
a hole extending through said lever, and being disposed adjacent said first end of said lever;
a hole extending into said pressure plate, said hole being in substantial axial alignment with said hole in said lever; and
a second pin disposed in said hole of said lever and said hole of said pressure plate; and said second biasing means comprises a second spring, said second spring being disposed about a portion of said second pin.

11. The friction clutch according to claim 10 wherein said adjusting means further comprises:
an additional ring element, slid at least one ring element being a first ring element and said additional ring element being a second ring element;
said sloped surface of said first ring element is disposed towards said pressure plate;
said first ring element contacts said first biasing means;
said second ring element comprises at least one portion having a sloped surface disposed to contact said sloped surface of said first ring element, said at least one portion of said second ring element having said sloped surface being disposed in said space;
said at least one portion of said second ring element having a plurality of dimensions defined parallel to the axis of rotation, each one of said plurality of dimensions of said second ring element being greater than an adjacent one of said plurality of dimensions of said second ring element to form said sloped surface of said second ring element;

said third biasing means being fixedly attached to both of said first and second ring elements;

said third biasing means further biasing said first ring element to rotate with respect to said second ring element to move said portion of said sloped surface of said first ring element having said greater one of said plurality of dimensions into contact with a portion of said second sloped surface of said second ring element having a greater one of said plurality of dimensions of said second ring element, upon wear of said friction lining means;

said second ring element being axially aligned with said first ring element;

each of said first ring element and said second ring element having a cross-section defined perpendicular to the axis of rotation, said cross-section having a rectangular shape having four sides, two of said four sides being longer than the other two of said four sides; and said two longer sides being guided along said pressure plate parallel to the axis of rotation.

12. The friction clutch according to claim 10 wherein said adjusting means further comprises:

at least one sloped surface disposed on said first biasing means;

said sloped surface of said at least one ring element being disposed towards said first biasing means and contacting said at least one sloped surface of said first biasing means; and said at least one ring element contacts said pressure plate.

13. The friction clutch according to claim 10 wherein said adjusting means further comprises:

at least one sloped surface disposed on said pressure plate;

said sloped surface of said at least one ring element being disposed towards said pressure plate and contacting said at least one sloped surface of said pressure plate; and said at least one ring element contacts said first biasing means.

14. The friction clutch according to claim 11 wherein:

said hole and said bore are parallel to one another, said hole being disposed radially inwardly from said bore;

said first end of said lever contacts said first ring element;

said means for limiting movement comprises a head portion disposed on said first end of said pin, said head portion projecting radially outwardly from said pin;

said first spring contacts said head portion;

said head portion contacts the flywheel;

said pressure plate is attached to said housing in an axially movable, but non-rotational manner with respect to said housing;

said first biasing means comprises a membrane spring, said membrane spring having an outer circumference and an inner circumference disposed within said outer circumference of said membrane spring;

said inner circumference of said membrane spring comprises a plurality of tabs extending radially inwardly towards the axis of rotation;

said membrane spring being supported on said pressure plate in an area of said membrane spring adjacent said outer circumference of said membrane spring;

said friction clutch further comprises at least one spacer bolt for supporting said membrane spring with respect to said housing, said membrane spring being supported on said housing in an area between said outer circumference of said membrane spring and said inner circumference of said membrane spring;

said at least one sensing means comprises one, sole sensing means;

said first and second ring elements each comprise sheet-metal;

said pressure plate has a first side and a second side facing away from one another, said first side facing the flywheel, and said second side facing said housing;

said bore extending from said first side of said pressure plate to said second side of said pressure plate;

said hole extending into said second side of said pressure plate;

said one sensing means is disposed adjacent said second side of said pressure plate;

said adjusting means is disposed adjacent said second side of said pressure plate; and said first spring contacts a portion of said first side of said pressure plate.

15. The friction clutch according to claim 12 wherein:

said hole and said bore are parallel to one another, said hole being disposed radially inwardly from said bore;

said first end of said lever contacts said first biasing means;

said means for limiting movement comprises a head portion disposed on said first end of said pin, said head portion projecting radially outwardly from said pin;

said first spring contacts said head portion;

said head portion contacts the flywheel;

said pressure plate is attached to said housing in an axially movable, but non-rotational manner with respect to said housing;

said first biasing means comprises a membrane spring, said membrane spring having an outer circumference and an inner circumference disposed within said outer circumference of said membrane spring;

said inner circumference of said membrane spring comprises a plurality of tabs extending radially inwardly towards the axis of rotation;

said membrane spring being supported on said pressure plate in an area of said membrane spring adjacent said outer circumference of said membrane spring;

said friction clutch further comprises at least one spacer bolt for supporting said membrane spring with respect to said housing, said membrane spring being supported on said housing in an area between said outer circumference of said membrane spring and said inner circumference of said membrane spring;

said one sensing means comprises one, sole sensing means;

said at least one ring element comprises sheet-metal;

said pressure plate has a first side and a second side facing away from one another, said first side facing the flywheel, and said second side facing said housing;

said bore extending from said first side of said pressure plate to said second side of said pressure plate;

said hole extending into said second side of said pressure plate;

said one sensing means is disposed adjacent said second side of said pressure plate;

said adjusting means is disposed adjacent said second side of said pressure plate; and said first spring contacts a portion of said first side of said pressure plate.

16. The friction clutch according to claim 13 wherein:

said hole and said bore are parallel to one another, said hole being disposed radially inwardly from said bore;

said first end of said lever contacts said first ring element;

said means for limiting movement comprises a head portion disposed on said first end of said pin, said head portion projecting radially outwardly from said pin;

said first spring contacts said head portion;

said head portion contacts the flywheel;

said pressure plate is attached to said housing in an axially movable, but non-rotational manner with respect to said housing;

said first biasing means comprises a membrane spring, said membrane spring having an outer circumference and an inner circumference disposed within said outer circumference of said membrane spring;

said inner circumference of said membrane spring comprises a plurality of tabs extending radially inwardly towards the axis of rotation;

said membrane spring being supported on said pressure plate in an area of said membrane spring adjacent said outer circumference of said membrane spring;

said friction clutch further comprises at least one spacer bolt for supporting said membrane spring with respect to said housing, said membrane spring being supported on said housing in an area between said outer circumference of said membrane spring and said inner circumference of said membrane spring;

said at least one sensing means comprises one, sole sensing means;

said at least one ring element comprises sheet-metal;

said pressure plate has a first side and a second side facing away from one another, said first side facing the flywheel, and said second side facing said housing;

said bore extending from said first side of said pressure plate to said second side of said pressure plate;

said hole extending into said second side of said pressure plate;

said one sensing means is disposed adjacent said second side of said pressure plate;

said adjusting means is disposed adjacent said second side of said pressure plate; and said first spring contacts a portion of said first side of said pressure plate.

17. A friction clutch for a motor vehicle, said friction clutch comprising:

a clutch housing;

a clutch disc disposed within said housing, said clutch disc defining an axis of rotation and an axial direction parallel to the axis of rotation;

said clutch disc for being disposed on a transmission input shaft;

a pressure plate for engaging and disengaging said clutch disc with a flywheel of an internal combustion engine;

said clutch disc being disposed between said pressure plate and the flywheel, said clutch disc comprising friction lining means for contacting the flywheel and said pressure plate upon engagement of said friction clutch;

first means for biasing said pressure plate towards the flywheel, said first biasing means being disposed between said clutch housing and said pressure plate;

means for adjusting the axial distance between said pressure plate and said first means for biasing upon wear of said friction lining means;

at least one means for sensing wear of said friction lining means, said at least one sensing means comprising:

projection means, said projection means comprising:

a first portion extending towards said adjusting means;

said first portion being operatively connected to said adjusting means to permit said adjusting means to adjust the axial distance between said pressure plate and said first means for biasing during a disengagement process of said friction clutch, which disengagement process follows an engagement process of said friction clutch wherein wear of said friction lining means has occurred; and a second portion disposed in said pressure plate;

means for providing friction for frictionally positioning said second portion with respect to said pressure plate, said means for providing friction comprising means for permitting sliding axial movement, against said friction, of at least one of: said pressure plate, and said at least one sensing means, one with respect to the other; and said means for providing friction comprising second means for biasing said first portion away from said pressure plate.

18. The friction clutch according to claim 17 wherein said at least one sensing means comprises means for receiving said second portion of said projection means, said means for receiving being disposed in said pressure plate.

19. The friction clutch according to claim 18 wherein said means for receiving comprises a bore, said bore having a longitudinal axis defined substantially parallel to the axis of rotation.

20. The friction clutch according to claim 19 wherein said at least one sensing means comprises means for limiting movement of said at least one sensing means towards the flywheel.

* * * * *

UNITED STATES PATENT AND TRADEMARK OFFICE
CERTIFICATE OF CORRECTION

PATENT NO. : 5,690,203
DATED : November 25, 1997
INVENTOR(S) : Achim LINK and Reinhold WEIDINGER It is certified that error appears in the above-identified patent and that said Letters Patent is hereby corrected as shown below:

In column 1, line 9, after 'Klaus', delete "Elsnet," and insert --Elsner--.

In column 2, line 1, after 'actuator', delete "levers" and insert --lever--.

In column 4, line 59, after 'can' insert --be--.

In column 17, line 39, Claim 3, after 'axis', delete "if" and insert --of--.

Signed and Sealed this

Seventh Day of April, 1998

Attest:

BRUCE LEHMAN

Attesting Officer

Commissioner of Patents and Trademarks